United States Patent
Tsubouchi et al.

[11] Patent Number: 6,061,342
[45] Date of Patent: May 9, 2000

[54] CODE DIVISION MULTIPLE ACCESS APPARATUS

[75] Inventors: Kazuo Tsubouchi, 1-7 Yukigaya, Otsuka-Cho, Ota-ku, Tokyo; Jun Hozumi; Toshiyuki Azuma, both of Miyagi-ken, all of Japan

[73] Assignee: Kazuo Tsubouchi, Japan

[21] Appl. No.: 08/822,374

[22] Filed: Mar. 20, 1997

[30] Foreign Application Priority Data

Mar. 22, 1996 [JP] Japan .................................. 8-066890

[51] Int. Cl.[7] .......................... H04B 7/216; H04B 15/00; H04J 3/06

[52] U.S. Cl. .......................... 370/342; 370/208; 370/350; 375/206; 375/207; 375/209

[58] Field of Search .................... 375/200, 208, 375/207, 305, 206, 149, 150, 209, 376; 370/208, 342, 350

[56] References Cited

U.S. PATENT DOCUMENTS

| | | | |
|---|---|---|---|
| 4,943,974 | 7/1990 | Motamedi | 375/200 |
| 4,943,975 | 7/1990 | Kurihara et al. | 375/208 |
| 5,073,898 | 12/1991 | Endo et al. | 375/200 |
| 5,077,753 | 12/1991 | Grau, Jr. et al. | 375/200 |
| 5,081,642 | 1/1992 | O'Clock, Jr. et al. | 375/208 |
| 5,179,574 | 1/1993 | Watanabe et al. | 375/376 |
| 5,260,969 | 11/1993 | Kato et al. | 375/150 |
| 5,276,704 | 1/1994 | Dixon | 375/208 |
| 5,353,304 | 10/1994 | Mochizuki | 375/200 |
| 5,471,499 | 11/1995 | Brown et al. | 375/305 |
| 5,784,403 | 6/1998 | Scott | 375/207 |
| 5,793,794 | 8/1998 | Kato et al. | 375/149 |
| 5,917,850 | 6/1999 | Fujita et al. | 375/200 |

OTHER PUBLICATIONS

"256kbps DS–SS Radio Unit, JU–2100A Using Digital Sliding Correlators", *The Institute of Electronics Information And Communications Engineers*, Technicle Report of IEICE, pp. 19–24 (with translation).

*Primary Examiner*—Hassan Kizou
*Assistant Examiner*—John Pezzlo
*Attorney, Agent, or Firm*—Brinks Hofer Gilson & Lione

[57] ABSTRACT

A code division multiple access apparatus which is capable of high-speed synchronization, is simple in construction and, moreover, achieves reduced consumption of electric power during standby. When a specific pattern contained in a signal received by a receiving antenna is detected by a SAW matched filter, a correlation peak is output from the filter. A bit synchronization signal generating circuit detects the correlation peak thereof and generates a synchronization signal after a set time has elapsed from the detection of the correlation peak. An orthogonal PN code generator generates a predetermined orthogonal PN code in accordance with the synchronization signal. Further, a carrier generator generates a carrier in response to the output of the SAW matched filter. This generated carrier is modulated by the output of the orthogonal PN code generator. Then, the signal received by the receiving antenna is multiplied together with the modulation output by a multiplier, integrated by an integrator and returned to its original baseband data form.

7 Claims, 7 Drawing Sheets

CODE DIVISION MULTIPLE ACCESS APPARATUS

BACKGROUND OF THE INVENTION

1. Field of the Invention

The present invention relates to spectral diffusion communication and, more particularly, to a code division multiple access apparatus which is capable of high-speed synchronization.

2. Description of the Related Art

Code division multiple access (CDMA) is capable of accepting users as long as setting of code synchronization is possible because communication quality is gradually degraded, and an increase in the number of users can be expected, whereas other multiple communications systems, for example, FDMA (frequency division multiple access) and TDMA (time division multiple access), are incapable of accepting more than a set number of users. Further, CDMA has excellent interference-resistant characteristics, signal secrecy and fading-resistant characteristics, and has a wide range of uses.

A CDMA communication apparatus causes the transmission apparatus to multiply baseband data to be transmitted by a diffusion code and to further multiply a carrier and transmit the resulting signal from an antenna. In the receiving apparatus, a diffusion code having the same phase as that of the diffusion code during transmission is prepared, and baseband data is taken using in-line correlation detection.

Figure 8:
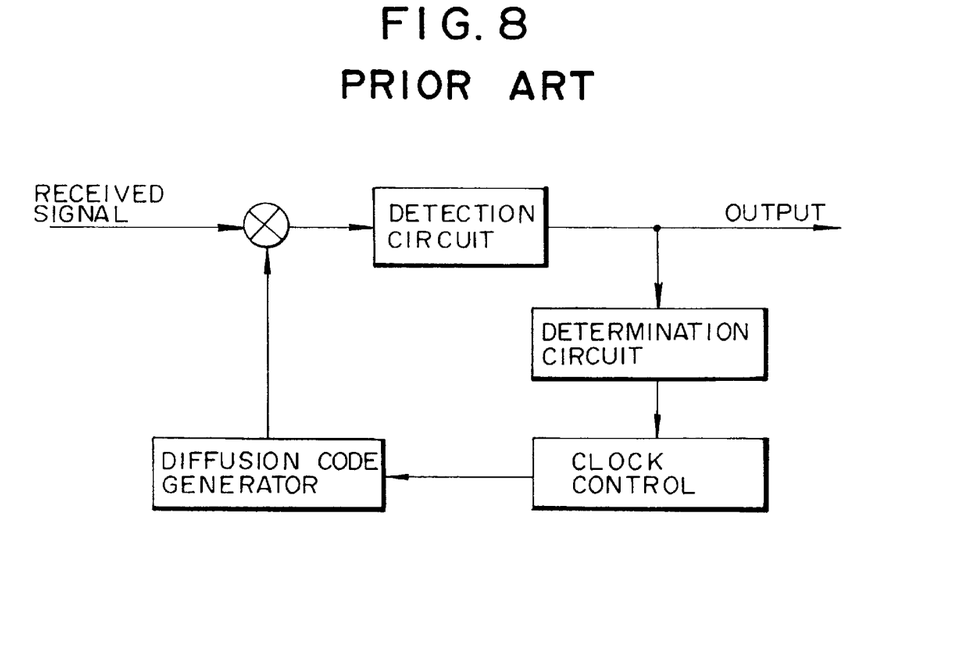
FIG. 8 is a block diagram illustrating the construction of a conventional digital sliding correlator.
Figure 9:
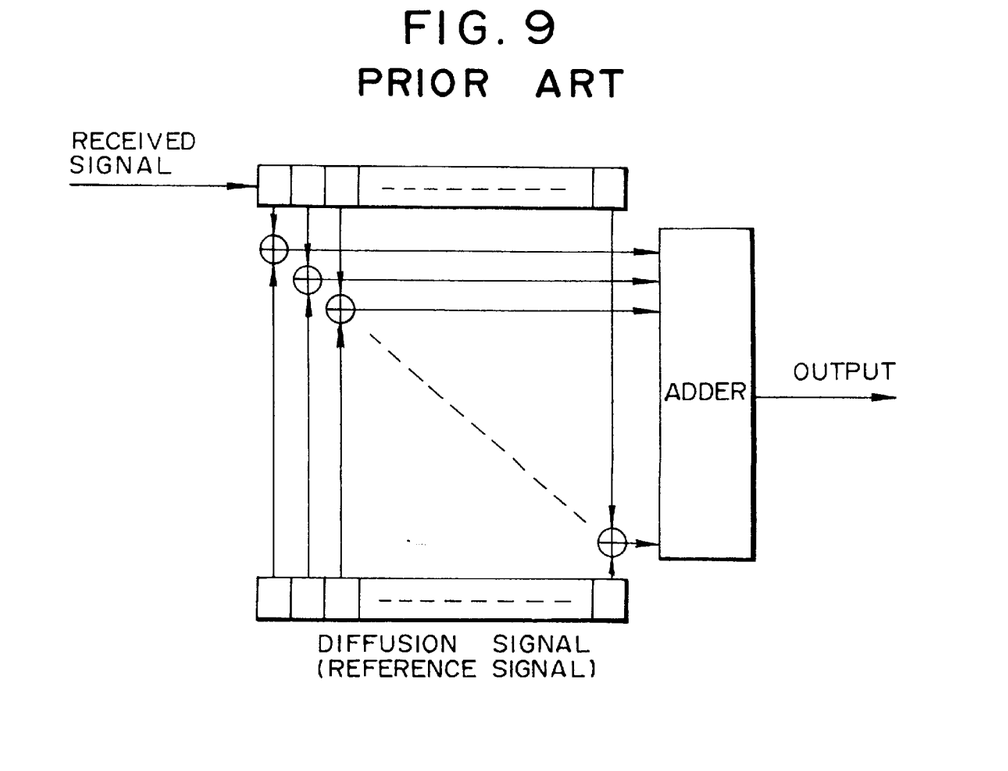
FIG. 9 is a block diagram illustrating the construction of a conventional digital matched filter.

Meanwhile, in this CDMA communication apparatus, timing at which a diffusion code is generated in the receiving apparatus, that is, synchronization acquisition, becomes a problem. Conventionally, as a synchronization acquisition method, a digital sliding correlator shown in FIG. 8, a digital matched filter shown in FIG. 9, or the like is used. The digital sliding correlator causes a diffusion code to cycle earlier than the received signal, and causes a determination circuit having a DLL (Delay Locked Loop) or the like to perform synchronization pull-in.

Since this digital sliding correlator has a synchronization mechanism using a loop, it is possible to maintain stable synchronization. However, there are drawbacks in that the operation is unstable due to the balance of the correlator, and cycling of a maximum of one cycle of a PN (Pseudorandom Noise) code is required and so synchronization acquisition takes time.

The digital matched filter, formed of a shift register, performs synchronization acquisition by detecting a correlation peak by performing correlation integration of a known diffusion code and a received signal. This digital matched filter is able to perform higher-speed synchronization than a sliding correlator. However, there is a possibility that the presence timing of the correlation peak may become uncertain. Further, when the number of bits for one cycle of a diffusion code increases (e.g., several thousand), the number of shift registers increases, posing economical problems. Furthermore, there are problems in that both the above-described sliding correlator and digital matched filter have a large electric power consumption during standby (other than during signal reception).

SUMMARY OF THE INVENTION

The present invention has been achieved in view of the above-described circumstances. It is an object of the present invention to provide a code division multiple access apparatus which is capable of high-speed synchronization, is simple in construction, and, moreover, achieves reduced consumption of electric power during standby.

To achieve the above-described object, according to a first aspect of the present invention, there is provided a code division multiple access apparatus, comprising: a receiving antenna; a surface-acoustic-wave device to which a signal received by the receiving antenna is fed and which extracts a specific pattern contained in the signal; synchronization signal generating means for detecting a correlation peak output from the surface-acoustic-wave device and generating a synchronization signal after a set time elapses from the detection of the correlation peak; code generating means for generating a predetermined code in synchronization with a synchronization signal output from the synchronization signal generating means; carrier generating means for generating a carrier on the basis of an output of the surface-acoustic-wave device; modulation means for modulating the carrier on the basis of an output of the code generating means; and detection means for detecting a signal received by the receiving antenna on the basis of an output of the modulation means.

According to a second aspect of the present invention, in the code division multiple access apparatus in accordance with the first aspect of the present invention, a SAW matched filter is used for the surface-acoustic-wave device.

According to a third aspect of the present invention, in the code division multiple access apparatus in accordance with the second aspect of the present invention, the SAW matched filter is formed of an $Al_2O_3$ substrate, an AlN film formed on this $Al_2O_3$ substrate, and an Al tapping pattern formed on the AlN film.

According to a fourth aspect of the present invention, in the code division multiple access apparatus in accordance with the first aspect of the present invention, the code generating means generates an orthogonal PN code.

According to a fifth aspect of the present invention, in the code division multiple access apparatus in accordance with the first aspect of the present invention, the synchronization signal generating means comprises a detection circuit for envelope-detecting an output of the surface-acoustic-wave device, a comparison circuit for detecting the time at which the output of the detection circuit exceeds a set level, and signal generating means for measuring a set time after receiving the output of the comparison circuit, and generating a synchronization signal at the time when the set time has elapsed.

The above and further objects, aspects and novel features of the invention will become more apparent from the following detailed description when read in connection with the accompanying drawings.

DESCRIPTION OF THE PREFERRED EMBODIMENT

Figure 1:
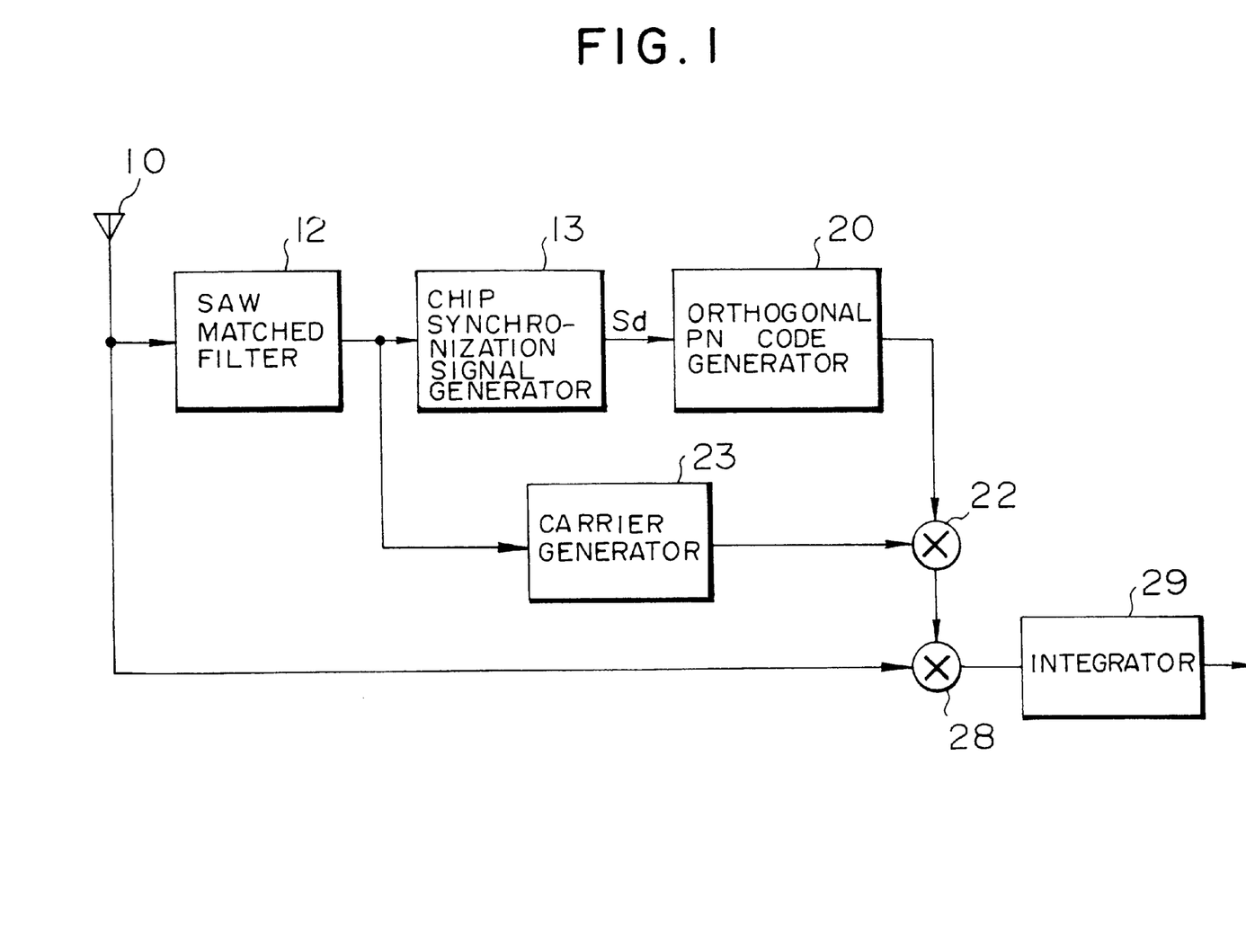
FIG. 1 is a block diagram illustrating the construction of a code division multiple access receiving apparatus in accordance with an embodiment of the present invention.
Figure 2:
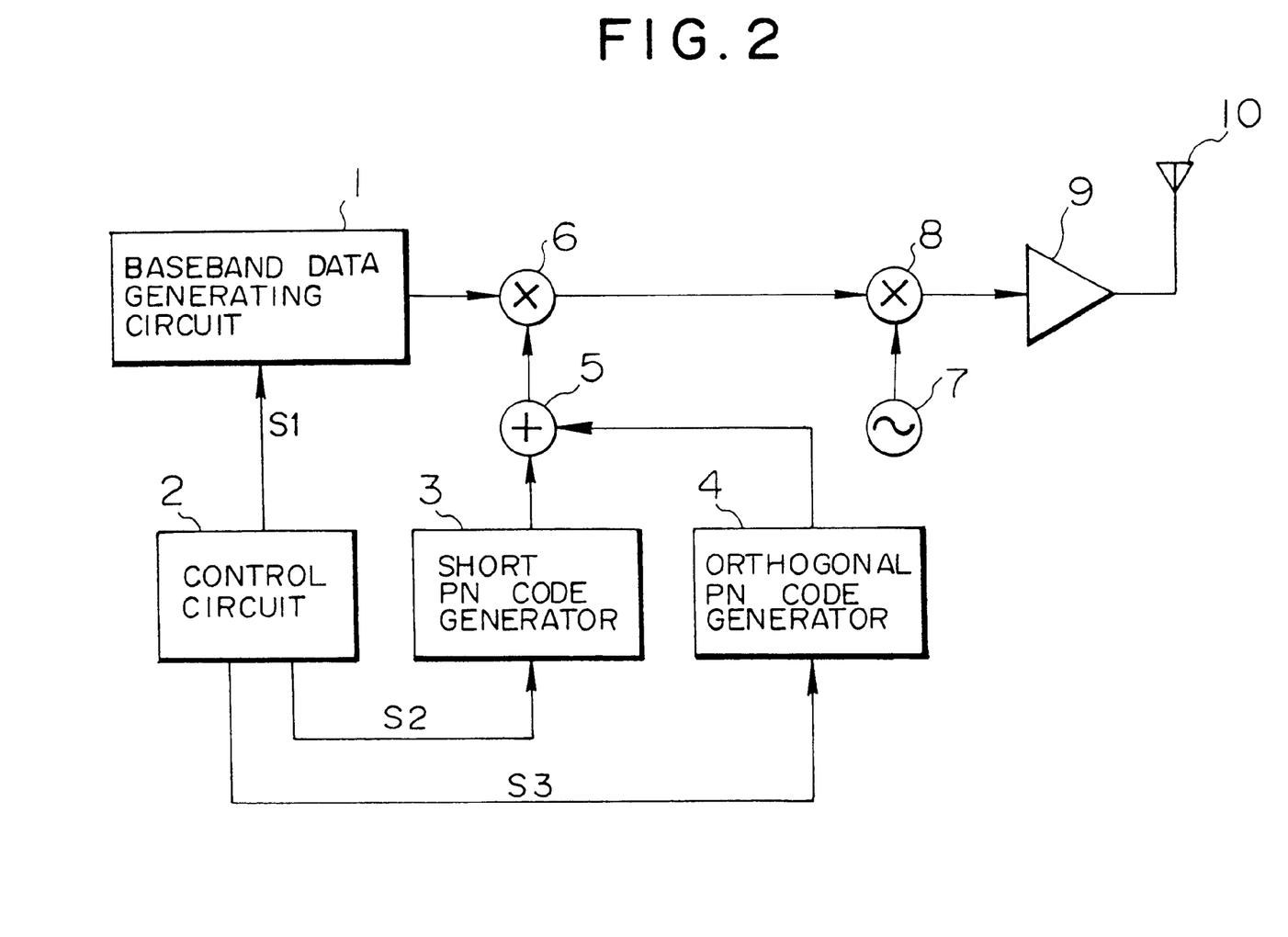
FIG. 2 is a block diagram illustrating the construction of a code division multiple access transmission apparatus in accordance with the embodiment of the present invention.

The preferred embodiment of the present invention will be described below with reference to the accompanying drawings. FIG. 1 is a block diagram illustrating the construction of a CDMA receiving apparatus in accordance with an embodiment of the present invention. FIG. 2 is a block diagram illustrating the construction of a CDMA transmission apparatus. The transmission apparatus will be described first.

Figure 3A:
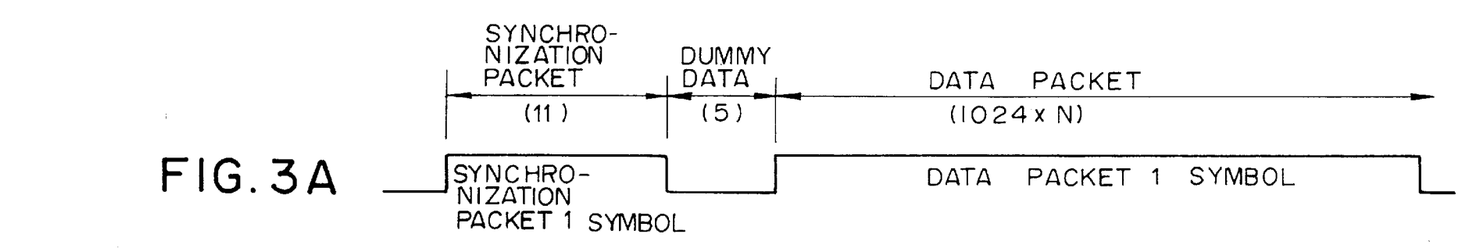
FIGS. 3A through 3H are waveform charts of each section of the transmitting apparatus shown in FIG. 2.

In FIG. 2, reference numeral 1 denotes a baseband data generating circuit for generating baseband data to be transmitted. Upon receiving a starting signal S1 from a control circuit 2, this baseband data generating circuit 1, as shown in FIG. 3A, first outputs a "1" signal for a period of 11 bits and then outputs a "0" signal for a period of 5 bits, and then outputs data to be transmitted. Further, the above operation is repeated. Here, the transmission data is such that one byte corresponds to 1024 bits; therefore, when the data to be transmitted is n bytes, data is output for a period of 1024×N bits.

Reference numeral 3 denotes a short PN code generator for generating a predetermined short PN code after a signal S2 (see FIG. 3B) from the control circuit 2 is switched to "1". Here, the short PN (Pseudorandom Noise) code is a pseudorandom noise code having a cyclic property, and M sequence, Barker sequence, Gold sequence and the like are known. In this embodiment, a 11-bit Barker code is used, and one cycle has the following structure: 11100010010.

Figures 3B, 3C:
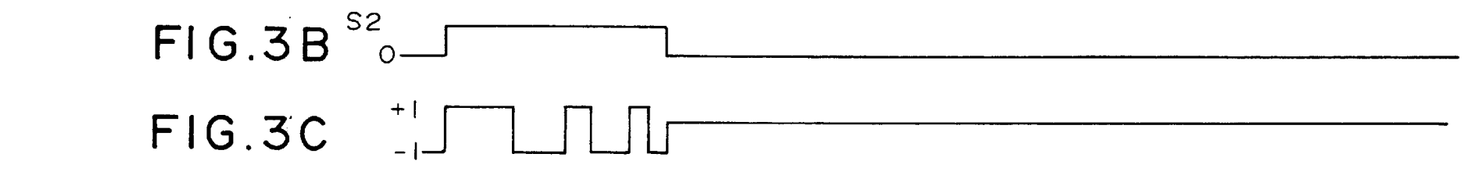

FIG. 3C shows an output of the short PN code generator 3.

Figure 3D:
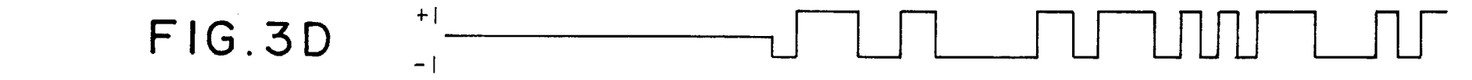
Figure 3E:
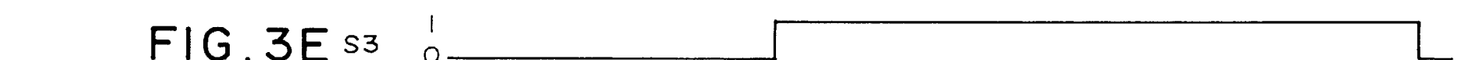

Reference numeral 4 denotes an orthogonal PN code generator for generating a predetermined orthogonal PN code after a signal S3 (see FIG. 3E) from the control circuit 2 is switched to "1". Here, the orthogonal PN code is a code sequence in which the self-correlation function reaches 0 when the phase difference is not 0, and is a code suitable for DS/CDMA since a side lobe does not occur. FIG. 3D shows an output of the orthogonal PN code generator 4.

Figure 3F:
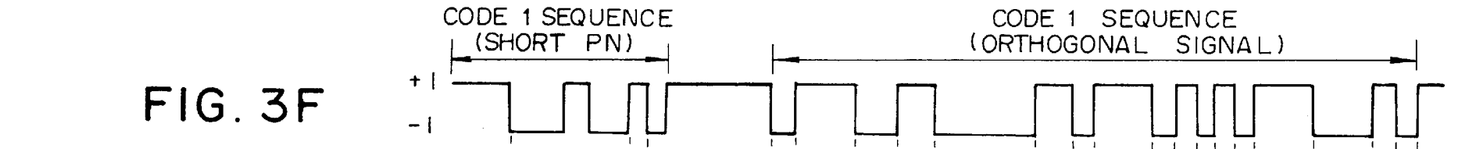
Figure 3G:
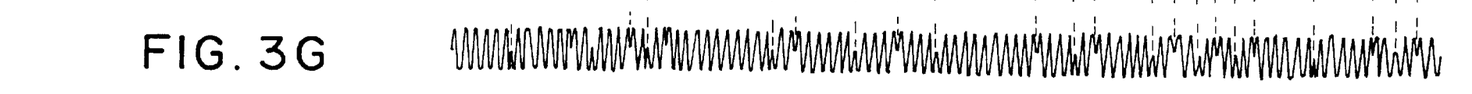
Figure 3H:
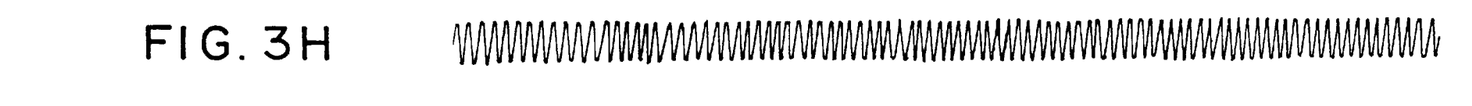

Reference numeral 5 denotes an adder for adding together an output of the short PN code generator 3 and an output of the orthogonal PN code generator 4. Reference numeral 6 denotes a multiplier for multiplying together an output of the baseband data generating circuit 1 and an output of the adder 5. The output of this multiplier is shown in FIG. 3F. Reference numeral 7 denotes an oscillator 7 for generating a carrier (see FIG. 3H). Reference numeral 8 denotes a multiplier for multiplying together the output of the multiplier 6 and the output of the oscillator 7. The output of this multiplier is shown in FIG. 3G. Reference numeral 9 denotes an amplifier for amplifying the output of the multiplier 8. Reference numeral 10 denotes an antenna for radiating the output of the amplifier 9 into space.

As described above, the transmission apparatus shown in FIG. 2 first transmits a short PN code of 11 bits and then dummy data of 5 bits, after which the transmission apparatus transmits transmission data (baseband data) which was diffuse-modulated by an orthogonal PN code.

Figure 4:
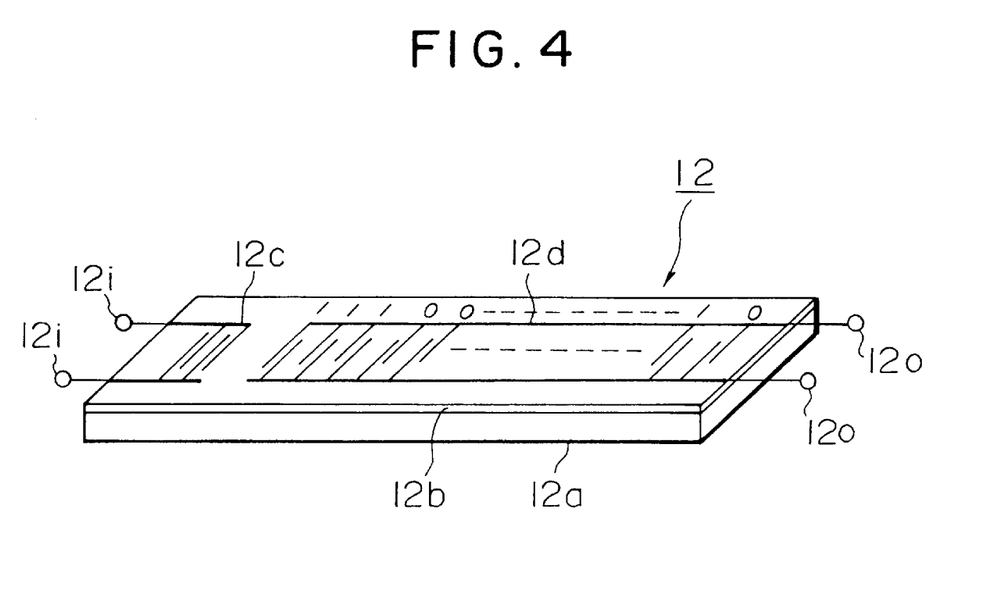
FIG. 4 is a perspective view illustrating the construction of a SAW correlator 12 shown in FIG. 1.

Next, the receiving apparatus will be described. In FIG. 1, reference numeral 10 denotes a receiving antenna, and reference numeral 12 denotes a SAW matched filter (SAW correlator). SAW is an abbreviation for "surface acoustic wave." FIG. 4 is a perspective view illustrating the construction of the SAW correlator 12. In FIG. 4, reference numeral 12a denotes a substrate formed from $Al_2O_3$ (sapphire), and reference numeral 12b denotes an AlN (aluminum nitride) film formed on this $Al_2O_3$ substrate by an MO-CVD process. An Al (aluminum) input pattern 12c and an Al tapping pattern 12d are each formed on this AlN film by photolithography. Here, the Al tapping pattern 12d is a pattern corresponding to the above-described Barker code (11100010010).

Figure 5A:
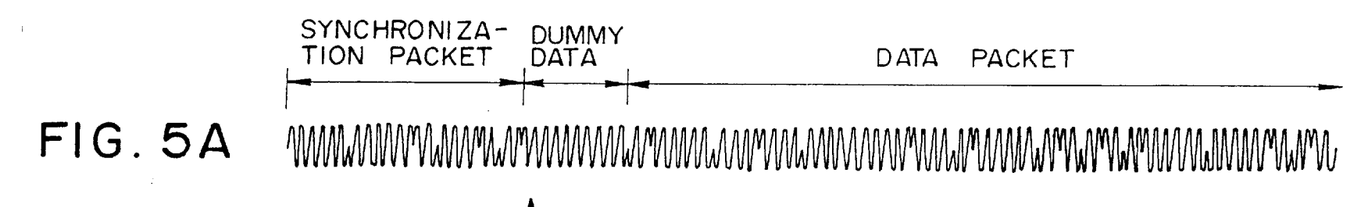
FIGS. 5A through 5F are waveform charts of each section of the receiving apparatus shown in FIG. 1.
Figure 5B:
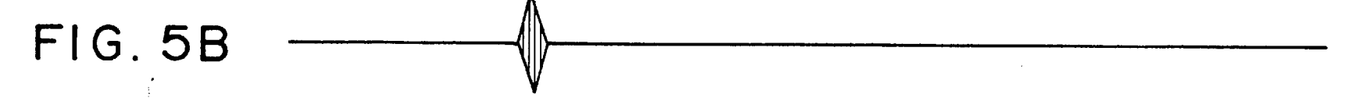

When the signal shown in FIG. 5A (the same as that shown in FIG. 3G) is received by the receiving antenna 10 and fed to the input pattern 12c of the SAW matched filter 12, the signal transforms into a SAW, propagates on the surface of the SAW matched filter 12, and then passes through the tapping pattern 12d. When the phase of the transmitted wave precisely coincides with the tapping pattern 12d, each wave amplitude is integrated, and a correlation peak which is 11 times as great appears at output ends 12o and 12o of the tapping pattern, as shown in FIG. 5B. When the phase of the wave does not coincide with the tapping pattern 12d, the voltage of the output ends 12o and 12o becomes $1/11$ or less of the correlation peak. The output of this SAW correlator 12 is applied to a bit synchronization signal generating circuit 13.

The propagation velocity of the $AlN/Al_2O_3$ structure shown in FIG. 4 is 1.5 to 2 times as great as that of other piezoelectric elements, e.g., approximately 6,000 m/sec, and thus the dimensions for processing can be enlarged. Further, the electromechanical coupling coefficient is relatively large, e.g., approximately 1%, and the propagation time temperature coefficient can be made zero; therefore, the $AlN/Al_2O_3$ structure is most suitable for a GHz-band SAW device material.

Figure 6:
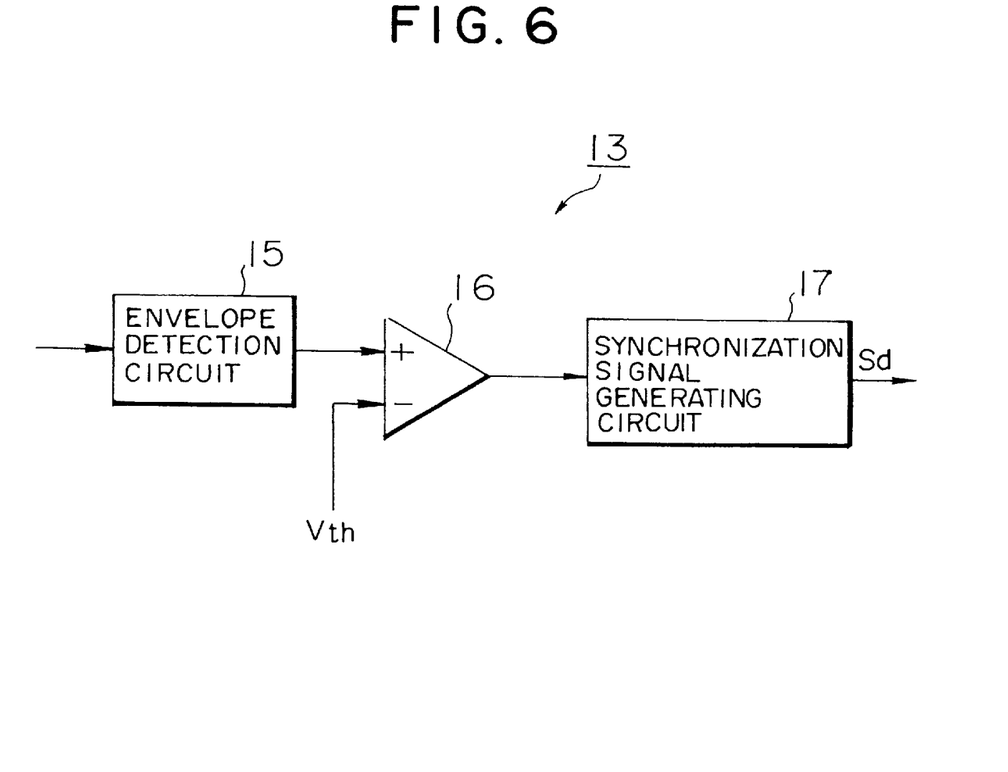
FIG. 6 is a block diagram illustrating the construction of a bit synchronization signal generator 13 shown in FIG. 1.

The bit synchronization signal generating circuit 13 is a circuit for generating a synchronization signal which indicates the timing at which an orthogonal PN code is generated. As shown in FIG. 6, the bit synchronization signal generating circuit 13 comprises an envelope detection circuit 15, a comparison circuit 16, and a synchronization signal generating circuit 17. The envelope detection circuit 15 performs envelope-detection of the output of the SAW matched filter 12, and supplies the output to the + input terminal of the comparison circuit 16. The comparison circuit 16 compares the output of the envelope detection circuit 15 with a set voltage Vth and outputs a detection signal when the former is greater than the latter. Here, the set voltage Vth is selected to a value such that the correlation peak of the SAW matched filter 12 can be detected. Therefore, when a correlation peak is output from the SAW matched filter 12, the comparison circuit 16 detects this output and outputs a detection signal to the synchronization signal generating circuit 17.

Upon receiving the detection signal from the comparison circuit 16, the synchronization signal generating circuit 17 outputs a synchronization signal Sd after a set time (predetermined time period) is elapsed. Here, the set time is a time at which the dummy data in FIG. 5A is transmitted. That is, the synchronization signal Sd indicates the time at which the beginning portion of the baseband data is received by the antenna 10.

Figure 5C:
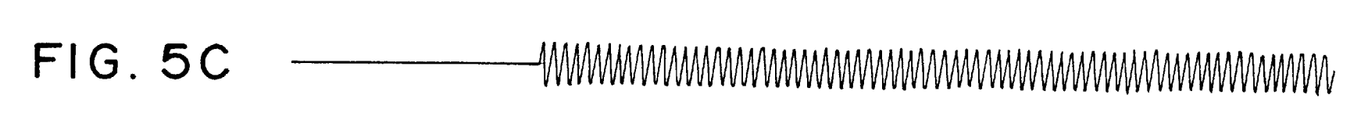
Figure 5D:
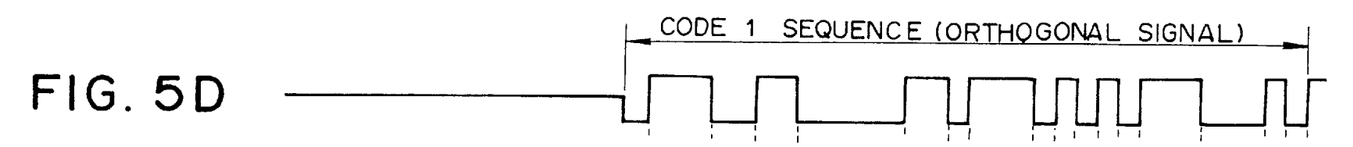

Upon receiving the synchronization signal Sd, the orthogonal PN code generator 20 generates an orthogonal PN code which is the same as that of the orthogonal PN code generator 4 in FIG. 2 and outputs it to a multiplier 22. FIG. 5D shows an output of the orthogonal PN code generator 4.

Figure 7:
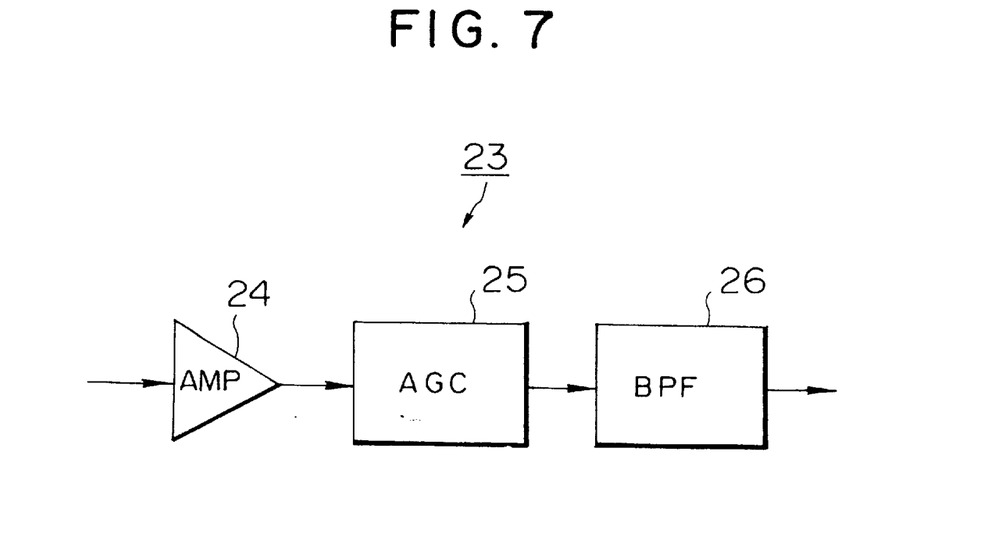
FIG. 7 is a block diagram illustrating the construction of a carrier generator 23 shown in FIG. 1.

A carrier generator 23 is a circuit for extracting a carrier contained in the output of the SAW matched filter 12 and outputting it after the level thereof is adjusted. As shown in FIG. 7, the carrier generator 23 comprises an amplifier 24 for amplifying the output of the SAW matched filter 12, an AGC (automatic gain control) circuit 25 for, upon receiving the output of the amplifier 24, outputting a carrier signal (see FIG. 5C) having a nearly constant level, and a band-pass filter 26 for removing noise components other than the carrier frequency.

Figure 5E:
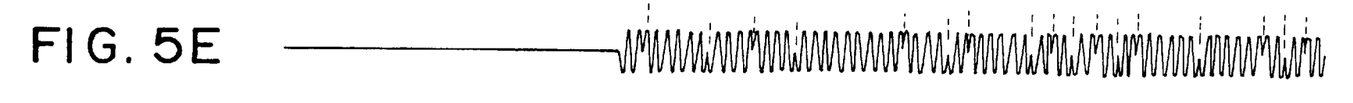
Figure 5F:
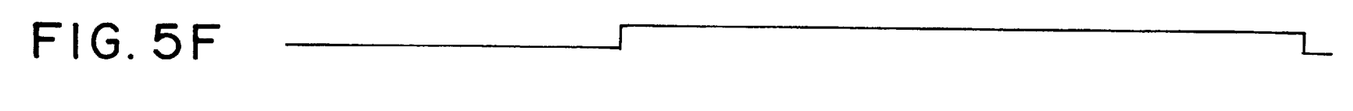

The multiplier 22 multiplies together the carrier signal output from the carrier generator 23 and the orthogonal PN code output from the orthogonal PN code generator 20, and outputs it to a multiplier 28 (see FIG. 5E). The multiplier 28 multiplies together the signal received by the antenna 10 and the output of the multiplier 22. That is, in this multiplier 28, in-line correlation detection is performed. The output of this multiplier 28 is integrated by the code length of the orthogonal PN code in an integrator 29 and demodulated into the original baseband data. FIG. 5F shows an output of the integrator 29.

As described above, in the above-described embodiment, a "packet method" is employed, a short PN code is used for synchronization acquisition/tracking, and an orthogonal PN code is used for diffusing transmission data. As a result, the correlation peak of the short PN code can be obtained from the SAW matched filter 12 in the RF band, and further, a synchronization signal and a carrier can be extracted; therefore, simple, high-speed synchronization acquisition is made possible. As a result, it becomes possible to easily form a CDMA communication apparatus by using in-line correlation detection.

Further, digital correlators, such as digital sliding correlators, cannot perform a correlation operation in the RF band (kept in a state in which the carrier is contained) and therefore, detection is required. Therefore, correlation cannot be performed under a low C/N (carrier/noise) under which detection is impossible. As compared with this, since the SAW matched filter can perform a correlation operation in the RF band, it is possible to suppress noise by an amount corresponding to the process gain achieved by a correlation operation. Therefore, a process proceeding from correlation detection to demodulation becomes possible even in low C/N.

Further, the SAW matched filter is a passive element and does not consume electric power. Therefore, it is possible to form an apparatus having a small amount of standby electric power. Furthermore, since the SAW matched filter can be used at the front end (kept in the RF band), it has advantages in that a down converter or the like is not required.

According to the present invention as described above, it is possible to provide a code division multiple access apparatus which is capable of high-speed synchronization, is simple in construction, and, moreover, achieves reduced consumption of electric power during standby.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A code division multiple access apparatus, comprising:

a receiving antenna adapted to receive a transmitted signal containing both a predetermined short pseudo-noise (PN) code for synchronization capturing and a predetermined orthogonal PN code containing diffusion-modulated base-band data;

a surface-acoustic-wave (SAW) matched filter including an electrode pattern to which said transmitted signal received by said receiving antenna is fed and which generates a correlation peak when said short PN code contained in the received signal coincides with the electrode pattern;

synchronization signal generating means for detecting the correlation peak output from said surface-acoustic-wave matched filter and generating a synchronization signal after a set time elapses from the detection of the correlated peak;

code generating means for generating said predetermined orthogonal PN code in response to the synchronization signal output from said synchronization signal generating means;

carrier generating means for generating a carrier contained in an output of said surface-acoustic-wave matched filter;

modulation means for modulating said carrier in accordance with the predetermined orthogonal PN code generated by said code generating means; and detecting means for detecting data contained in the signal received by said receiving antenna in response to an output of said modulation means.

2. A code division multiple access apparatus according to claim 1, wherein said SAW matched filter comprises an $Al_2O_3$ substrate, an AlN film formed on this $Al_2O_3$ substrate, and an Al tapping pattern formed on said AlN film.

3. A code division multiple access apparatus according to claim 1, wherein said synchronization signal generating means comprises:

a detection circuit for detecting the output of said surface-acoustic-wave matched filter, a comparison circuit for generating a detection signal when the output of said detection circuit exceeds a set level, and signal generating means for measuring a set time period after receiving the detection signal and generating a synchronization signal when the set time period has elapsed.

4. A code division multiple access apparatus, comprising:

a receiving antenna adapted to receive a transmitted signal containing both a predetermined short pseudo-noise (PN) code for synchronization capturing and a predetermined orthogonal PN code containing diffusion-modulated base-band data; and a surface-acoustic-wave matched filter having an input terminal connected to the receiving antenna, the surface-acoustic-wave matched filter including an electrode pattern formed to generate a correlation peak when said short PN code included in a signal transmitted to the receiving antenna coincides with the electrode pattern.

5. The code division multiple access apparatus according to claim 4, further comprising:

a synchronization signal generating circuit connected to an output terminal of the surface-acoustic-wave matched filter, the synchronization signal generating circuit generating a synchronization signal a predetermined time period after the correlation peak is generated;

code generating means for generating a predetermined orthogonal PN code in response to the synchronization signal output from the synchronization signal generating means;

carrier generating means for generating a carrier contained in an output of the surface-acoustic-wave matched filter;

modulation means for modulating the carrier in accordance with the predetermined code generated by the code generating means; and detecting means for detecting data contained in the signal received by the receiving antenna in response to an output of the modulation means.

6. The code division multiple access apparatus according to claim 5, wherein said SAW matched filter comprises an $Al_2O_3$ substrate, an AlN film formed on this $Al_2O_3$ substrate, and an Al tapping pattern formed on said AlN film.

7. The code division multiple access apparatus according to claim 5, wherein said synchronization signal generating means comprises:

a detection circuit for detecting the output of said surface-acoustic-wave matched filter, a comparison circuit for generating a detection signal when the output of said detection circuit exceeds a set level, and signal generating means for measuring a set time period after receiving the detection signal and generating a synchronization signal when the set time period has elapsed.

* * * * *